United States Patent
Zhang et al.

(10) Patent No.: US 10,802,386 B2
(45) Date of Patent: Oct. 13, 2020

(54) ENHANCED WAVELENGTH CONVERSION DEVICE

(71) Applicant: Materion Corporation, Mayfield Heights, OH (US)

(72) Inventors: David Zhang, Shanghai (CN); Ying Cao, Shanghai (CN); Lennon Li, Shanghai (CN)

(73) Assignee: Materion Corporation, Mayfield Heights, OH (US)

( * ) Notice: Subject to any disclaimer, the term of this patent is extended or adjusted under 35 U.S.C. 154(b) by 0 days.

(21) Appl. No.: 16/060,157

(22) PCT Filed: Dec. 15, 2015

(86) PCT No.: PCT/CN2015/097366
§ 371 (c)(1),
(2) Date: Jun. 7, 2018

(87) PCT Pub. No.: WO2017/100996
PCT Pub. Date: Jun. 22, 2017

(65) Prior Publication Data
US 2018/0348614 A1    Dec. 6, 2018

(51) Int. Cl.
*G03B 21/20* (2006.01)
*G03B 21/00* (2006.01)
*B32B 7/12* (2006.01)

(52) U.S. Cl.
CPC .............. *G03B 21/204* (2013.01); *B32B 7/12* (2013.01); *G03B 21/00* (2013.01);
(Continued)

(58) Field of Classification Search
None
See application file for complete search history.

(56) References Cited

U.S. PATENT DOCUMENTS 7,547,114 B2 * 6/2009 Li .................. H04N 9/3161
362/231
8,994,259 B2 * 3/2015 Tamaki .................... B05D 5/06
313/483
(Continued)

FOREIGN PATENT DOCUMENTS

CN         102709449 A     10/2012
CN         104100933 A     10/2014
(Continued)

OTHER PUBLICATIONS

"Dowsil Cl-2001 White Reflective Coating" (2018) https://www.ellsworth.com/globalassets/literature-library/manufacturer/dow-corning/dow-corning-ci-2001-white-reflective-coating-presentation.pdf (Year: 2018).*

(Continued)

*Primary Examiner* — Rhonda S Peace
(74) *Attorney, Agent, or Firm* — Tucker Ellis LLP; Carlos P. Garritano

(57) ABSTRACT

A wavelength conversion device comprises: a substrate; a reflective resin layer on the substrate; and a wavelength conversion layer on the reflective resin layer, configured to receive incident light and to provide output light by wavelength conversion of the incident light, such that the output light is reflected by the reflective resin layer. A method for manufacturing a wavelength conversion device by applying a reflective resin layer to a substrate and providing a wavelength conversion layer on the reflective resin layer is further provided.

25 Claims, 5 Drawing Sheets

(52) U.S. Cl.
CPC ...... *G03B 21/2066* (2013.01); *B32B 2255/26* (2013.01); *B32B 2307/416* (2013.01); *B32B 2313/00* (2013.01); *B32B 2551/00* (2013.01)

(56) References Cited

U.S. PATENT DOCUMENTS

| | | | | |
|---|---|---|---|---|
| 9,417,515 | B2* | 8/2016 | Barman | G03F 7/70316 |
| 9,835,310 | B2* | 12/2017 | Tamaki | B05D 5/06 |
| 9,982,878 | B2* | 5/2018 | Weber | C04B 37/026 |
| 10,145,541 | B2* | 12/2018 | Yu | F21S 41/176 |
| 10,353,280 | B2* | 7/2019 | Huang | G03B 21/204 |
| 2007/0161135 | A1* | 7/2007 | Keller | B41J 3/407 |
| | | | | 438/26 |
| 2013/0056775 | A1 | 3/2013 | Kawakami | |
| 2013/0257264 | A1* | 10/2013 | Tamaki | B05D 5/06 |
| | | | | 313/503 |
| 2014/0091346 | A1* | 4/2014 | Fujii | H01L 33/505 |
| | | | | 257/98 |
| 2015/0159836 | A1* | 6/2015 | Tamaki | B05D 5/06 |
| | | | | 362/84 |
| 2015/0226389 | A1* | 8/2015 | Kasugai | G02B 26/008 |
| | | | | 353/31 |
| 2016/0123557 | A1* | 5/2016 | Xu | C09K 11/02 |
| | | | | 362/84 |
| 2017/0031172 | A1* | 2/2017 | Lofftus | G02F 1/0128 |
| 2018/0348614 | A1* | 12/2018 | Zhang | G03B 21/00 |
| 2019/0056586 | A1* | 2/2019 | Zhang | H04N 9/3114 |

FOREIGN PATENT DOCUMENTS

| | | |
|---|---|---|
| CN | 104713035 A | 6/2015 |
| JP | 2012 185980 A | 9/2012 |
| JP | 2016526191 A | 9/2016 |
| TW | 201245844 A | 11/2012 |
| TW | 201326306 A | 7/2013 |
| TW | 201515289 A | 4/2015 |
| WO | WO 2015/055088 A1 | 4/2015 |
| WO | WO 2015/055089 A1 | 4/2015 |
| WO | WO 2015/180630 A1 | 12/2015 |

OTHER PUBLICATIONS

Dow Corning Cl-2001 White Reflective Coating (Mar. 11, 2015) https://samaro.fr/pdf/FT/DOW_CORNING_ELECTRONICS_FT_Cl-2001_EN.pdf (Year: 2015).*
International Search Report dated Sep. 19, 2016 issued in priority application PCT/CN2015/097366.
Taiwan Search Report from Taiwan Application No. 105101728 dated Jan. 7, 2019.
Extended European Search Report for European Application No. 15910469.4 dated May 23, 2019.

* cited by examiner

Fig. 1 – PRIOR ART

ENHANCED WAVELENGTH CONVERSION DEVICE

This is a 371 of PCT Patent Application Serial No. PCT/CN2015/097366 filed Dec. 15, 2015.

TECHNICAL FIELD OF THE INVENTION

The invention concerns a wavelength conversion device, such as a phosphor or color wheel. A method for manufacturing a wavelength conversion device is also provided.

BACKGROUND TO THE INVENTION

Projection systems may use a color wheel to generate light of different colors from a light source. The light source typically provides white light. The color wheel may comprise a circular substrate with surface segments of different colors. When the color wheel is rotated with light incident upon it, its output provides light of varying color.

A phosphor wheel is a similar device in which some or all segments of the surface of circular substrate are coated with a phosphor. The phosphor is often mixed with glue or other transparent material for application to the substrate surface. Solid state phosphors can additionally or alternatively be used. Different phosphors may be used in different segments to provide more than one emission color output.

Color wheels or phosphor wheels can be of: a transmissive type, in which the output light passes through the substrate; or a reflective type, in which the substrate reflects the output light. For a reflective type color or phosphor wheel, it is desirable that the reflectance of the substrate be maximized. The choice of materials for the substrate can affect the reflectance, due to their differing reflectivities. For example, an aluminum (Al) coated substrate typically has an average reflectance of 94% (in the wavelength range from about 420 nm to about 680 nm). In contrast, a silver (Ag) coated substrate generally has an average reflectance of 98% (in the wavelength range from about 420 nm to about 680 nm). Thus, there is an additional 4% reflectance loss by using an Al coated substrate over an Ag coated substrate. This also results in a consequent drop in the collection efficiency for light conversion, for example blue-to-yellow conversion for certain types of phosphor.

Robustness and durability is another concern for reflective type color or phosphor wheels. Again, the choice of material for the substrate can affect these performance characteristics. After hundreds of hours working at a high temperature (above 150° C.), burning in the area of laser incidence is typically observed on Ag-coated substrates. Migration of silver ions in the coating layer at high temperatures may be a cause of this effect. This can lead to around a 9% loss of optical performance. Similar problems may be present in other types of substrate. Such an effect is not seen to the same extent in Al-coated substrates, however.

Attempts to improve the reflectance of the substrate by adding a layer on the substrate have been considered. For example, CN 103912848 suggests providing a diffusely reflecting material on the substrate of a color wheel, which may include a metal, organic polymer or ceramic. Optical efficiency of the color wheel may be improved by this material. However, the cost of some such materials may be high. Moreover, this approach does not consider durability or robustness.

Achieving both high reflectance and long durability and more particularly, a high reflectance throughout a device's lifespan, presents a significant challenge in the design of color or phosphor wheels and in the field of optical wavelength conversion devices more generally. It would further be beneficial to achieve this with low manufacturing cost.

SUMMARY OF THE INVENTION

Against this background, there is provided a wavelength conversion device (typically for optical wavelengths), comprising: a substrate; a reflective resin layer (such as silicone) on the substrate; and a wavelength conversion layer on the reflective resin layer, configured to receive incident light and to provide output light by wavelength conversion of the incident light, such that the output light is reflected by the reflective resin layer. The wavelength conversion device is typically a color wheel or phosphor wheel. Other preferred features are disclosed with reference to the claims and in the description below.

Advantageously, the addition of a reflective resin layer, such as a silicone layer (for instance comprising a siloxane, such as octamethytrisiloxane) on (more preferably, directly on) the substrate improves both reflectance and durability. The silicone-based layer is a cost-effective surface treating material, providing high reflectance (an increase of 9% in the emission light power has been observed), without any observed optical performance degradation in environment and lifetime tests. Similar advantages may be possible with other types of reflective resin. Both the material and the manufacturing process are low cost compared with other approaches and the manufacture process is flexible. Moreover, the surface coating layer does not result in an increase of the device's working temperature. A high temperature resistance, working long hours in temperatures up to 200° C. has been seen. The material of the substrate is no longer relevant and this may be equally applicable to substrates formed of metallic, non-metallic and/or composite materials. It has further been observed that the reflectance depends on the thickness of the silicone layer, so this allows setting the reflectance to a desired level.

The reflective resin layer can act as a bonding layer. In this way, the reflective resin layer may cause or assist adhesion of the wavelength conversion layer to the substrate. Additionally or alternatively, a bonding layer (glue and/or tape) may be provided to adhere the wavelength conversion layer to the reflective resin layer and substrate. This may be especially useful for solid-state wavelength conversion layers, such as phosphor particles dispersed in glass, phosphor particles dispersed in a crystal or phosphor particles dispersed in a ceramic material.

Another form of wavelength conversion layer comprises phosphor particles (such as a powder) dispersed in (a generally transparent) silicone. In this case, the reflective resin layer is distinct (and distinguishable) from the wavelength conversion layer through its composition and/or structure. For instance, the reflective resin layer does not comprise an optically significant quantity of phosphor (or possibly any phosphor).

A corresponding method for manufacturing a wavelength conversion device may be provided.

BRIEF DESCRIPTION OF THE DRAWINGS

The invention may be put into practice in various ways, a number of which will now be described by way of example only and with reference to the accompanying drawings in which.

DETAILED DESCRIPTION OF PREFERRED EMBODIMENTS

Figure 1:
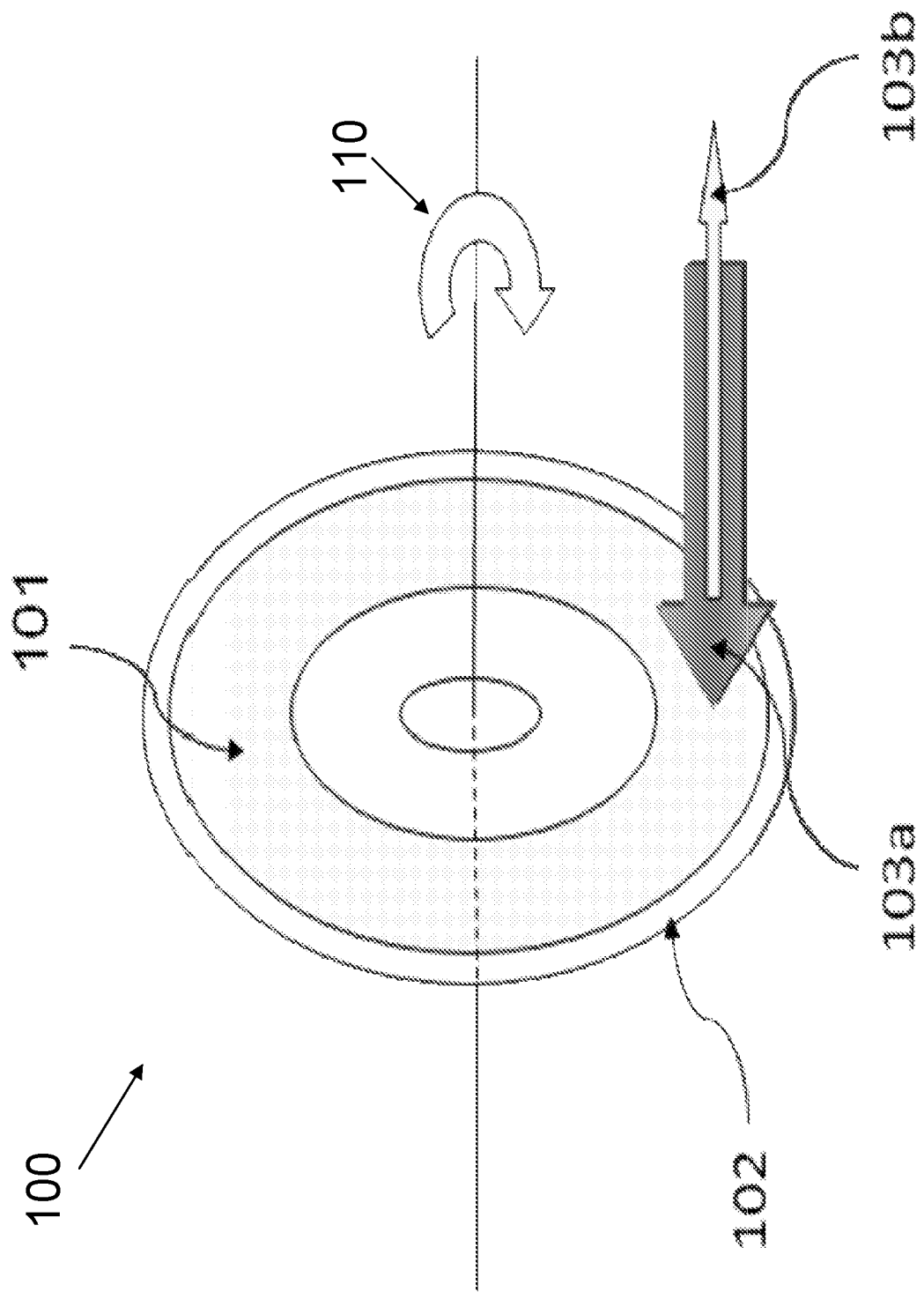
FIG. 1 depicts an existing phosphor wheel schematically, showing a mode of operation.

In FIG. 1, there is shown an existing phosphor wheel, which can be used in an optical projector, for example. The phosphor wheel 100 comprises: a plate 102; and a wavelength conversion material 101. The plate 102 typically comprises a metal coated with a reflective material. The plate 102 may be termed a substrate and in this case, is a disc or ring. It is attached to a motor (not shown), to cause it to rotate as shown by arrow 110, normally at high speed. Although this is shown as a phosphor wheel 100, this class of devices may more generally be termed a wavelength conversion device or light convertor. For example, such devices may be used in a static (non-rotating) configuration.

A wavelength conversion material 101 is disposed on the plate 102. The wavelength conversion material 101 has a ring shape, which is typical. The wavelength conversion material 101 may be made of a phosphor and glue mixture or it may be a phosphor ceramic. In this case, the wavelength conversion material 101 is a phosphor and silicone mixture. Phosphors for converting blue to green or yellow light are commonly used. The phosphor powders are dispersed in liquid transparent silicone by dispensing or screen printing or other coating method. This layer is then thermally cured and solidified to color segments on the mirror coated substrate 102 in a concentric pattern.

Any structure or material that can convert the wavelength of received light in a similar way to a phosphor can of course be used instead. A single color phosphor 101 is shown in this case, but multiple color segments (not shown here), each of which is used to generate light with a particular color, may alternatively be used.

Wavelength conversion materials such as phosphors receive and absorb excitation light of a first wavelength and emit light of a second, different wavelength. They may be used to generate light of specific wavelengths, where the optical power output for light sources providing that wavelength directly is limited. The incident or excitation light 103a propagates and illuminates the wavelength conversion material (phosphor) 101 (in the form of a light spot), which generates emission light 103b of a different wavelength to that of the excitation light.

The plate 102 of a phosphor wheel in this configuration reflects the converted light, so that the converted light 103b is emitted at the same side of the plate 102 as that at which the excitation light 103a is received. The converted light 103b is then collected by a lens system (not shown).

Figure 2:
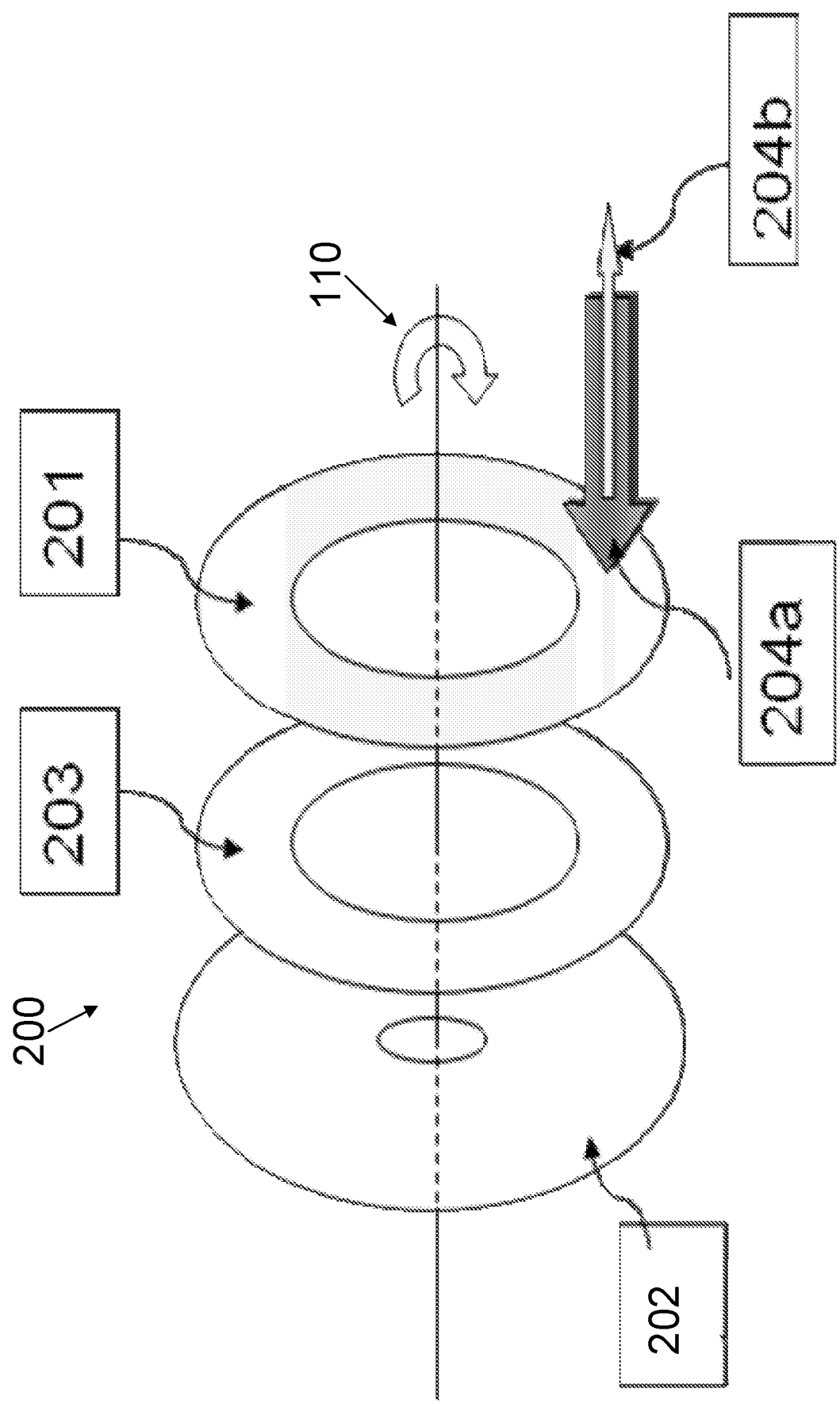
FIG. 2 illustrates a first embodiment of a phosphor wheel in accordance with the disclosure and in exploded schematic form, also showing a mode of operation.

Referring now to FIG. 2, there is illustrated a first embodiment of a phosphor wheel 200 in accordance with the disclosure and in exploded schematic form. The phosphor wheel 200 comprises: a substrate 202 (in the form of a disc); and a phosphor 201. Additionally, a high reflectivity white reflective coating layer 203 is provided. In this embodiment, this is a silicone material, sold under the name CI-2001 by Dow Corning Corporation. Further information about this material may be found on its Technical Data Sheet and Safety Data Sheet, the contents of which are incorporated by reference. The main constituent of this material is octamethyltrisiloxane (which is a reflective resin) and it also comprises: titanium dioxide (concentration around 20 to 30%, Refractive Index 2.1); silicon dioxide (around 1 to 5%, RI 1.47); and aluminum hydroxide (around 1 to 5%, RI 1.8). These additional constituents may be further active ingredients for light diffusive reflection. This material cures at room temperature to a tough, resilient and non-tacky surface and has low flammability, although a mild heat acceleration (after solvent flash-off) can speed in-line processing. The material also has a low viscosity that enhances flow and fills in narrow gaps and spaces. Typically, a suitable material should be operational over a temperature range of −45 to 200° C. (−49 to 392° F.) for long periods of time (at least 1500 hours). However, at the low- and high temperature ends of the spectrum, behavior of the materials and performance in particular applications can become more complex and require additional considerations. Factors that may influence performance are configuration and stress sensitivity of components, cooling rates and hold times and prior temperature history. At the high-temperature end, the durability of the cured silicone elastomer is time and temperature dependent.

Silicone material is coated on the disc substrate 202. The substrate typically comprises a rigid material, such as a metal for example aluminum. The smoothness, roughness or unevenness of the substrate surface is not relevant. However, it is highly desirable that the substrate surface on which the silicone layer 203 is provided be clean without pollution, stain, oil, organic residue or biological residue. For low-surface energy surfaces, adhesion may be improved by priming or by special surface treatment, such as chemical or plasma etching and ozone cleaning.

The silicone material is mixed with an organic solvent before coating, which in this case comprises methyl siloxane and is sold by Dow Corning Corporation under the name OS-20. Further information about this material may be found on its Technical Data Sheet and Safety Data Sheet, the contents of which are incorporated by reference. This is a volatile solvent and is used as dilution to adjust the solution viscosity. The mixed silicone material is prepared as homogeneous according to process requirements and silicon oil thinner is added to adjust the viscosity before putting this into a mixing machine to do the mix. A two-step mixing program for the mixture machine is recommended, with 600 RPM low speed for 60 s then 1200 RPM high speed for 120 s.

The silicone layer is formed on the substrate 202 by spray coating. Room temperature curing or room temperature vulcanization (RTV) is normally used, but the cure rate can be accelerated (and the time required to reach a tack-free state may be reduced) by mild heat. Thermal curing can alternatively be used. Atmospheric moisture may assist the cure. Adequate time for the solvent to evaporate prior to exposing to elevated temperatures in an air circulating oven should be allowed. A typical cure schedule for 3 mil (75 micron) coatings is 10 minutes at room temperature, followed by 10 minutes at 60° C. If the coating blisters or contains bubbles, additional time at room temperature is allowed for the solvent to flash off prior to oven cure. The pot life of the silicone material is dependent on the application method chosen. To extend the pot life, exposure to moisture is minimized by using dry air or dry nitrogen blanketing whenever possible. Adhesion of the silicone material typically lags behind the cure and may take up to 48 hours to build. Curing therefore forms the silicone coating layer 203. After curing, the solvent (such as OS-20) is not present in the layer. This structure generally has a high light reflectivity between wavelengths of 380 nm to 800 nm. For example, the reflectance of the disc surface can achieve 98% after curing. The typical thickness of the silicone layer to achieve a 98% reflectance is around 0.05 mm to around 0.15 mm. This results a 10% output power increase in a 60 W laser input system and no decrease in reflectance was noted after 1500 hours of operation at 200° C., as will be discussed below.

The phosphor powders are dispersed in liquid transparent silicone by dispensing or screen printing or other coating method. They are then thermally cured and solidified to form color segments or color ring 201 on the disk substrate 202 with silicone coating 203. The silicone layer 203 may also improve bonding between the substrate 202 and the color ring 201. Finally, the color wheel may be mounted on a motor to rotate with high speed. Optional implementations associated with the device shown in FIG. 1 (described above) are also applicable to this embodiment. For example, the device can also be used in the static (non-rotating) configuration.

The performance of coated discs, using either metal coatings (in line with the implementation of FIG. 1) or a silicone coating (in line with the embodiment of FIG. 2) was tested experimentally. One of metal coated discs was Al-coated and the other was Ag-coated. For the silicone coated discs, one had a 0.1 mm silicone layer and another had a 0.15 mm silicone layer. The table below summarizes the performance of these four implementations. For comparison purposes, the efficiency of the Al-coated disc (without the silicone coating) was set at 100% as a benchmark. The efficiencies of the other discs were then based on this value.

|  | Emission output power in 60 W laser excitation system | Efficiency |
|---|---|---|
| Ag coated disk | 23.1 W | 109.4% |
| Al coated disk | 21.1 W | 100% |
| Reflective coating disk T0.10 mm | 23.53 W | 111.5% |
| Reflective coating disk T0.15 mm | 23.4 W | 110.9% |

It can be seen the performance of the silicone coated discs were at least as good as the Ag coated disc, if not better. Moreover, it was noted that the thickness of the silicone coating affects its reflectance. There may be an optimal thickness to achieve a desired reflectance. An optimal thickness for this implementation appears to be around 0.1 mm. Typically, the thickness will be set in order to maximise the reflectance. This may cause the maximum conversion of light output in the desired wavelength range or band using the white reflective coating. Experimentally, it has been seen that a thicker coating layer provides a higher reflectance, but that a thicker coating can also result in long term failure, for example due to peeling or cracking of the reflective coating. Thus, an optimal coating thickness may be determined by an optimal reflectance and/or some compromise between the reflectance and durability. In practice, the optimal thickness may depend on the application and can be determined by experimentation or trial and error. Some results along these lines are discussed below.

In general, this may be considered as a wavelength conversion device, comprising: a substrate; a reflective resin layer on the substrate; and a wavelength conversion layer on the reflective resin layer, configured to receive incident light and to provide output light by wavelength conversion of the incident light. In this way, the output light is reflected by the reflective resin layer. The reflective resin layer typically covers a surface of the substrate on which the wavelength conversion layer is applied. As a consequence, the reflective resin layer controls the reflectance of the device, rather than the substrate. The material of the substrate is then not necessarily important, although the substrate is advantageously rigid and may comprise one of: a metal material; a non-metallic material; and a composite material. The reflective resin layer is generally directly on the substrate, but another layer may optionally partially or fully interpose between the substrate and the reflective resin layer in some cases. The substrate generally has a disc shape. The surface of the substrate on which the reflective resin layer is provided may have a reflective coating. The surface may comprise aluminum and/or the coating may comprise aluminum.

The reflective resin layer is typically white and in the preferred embodiment is configured to reflect across a wavelength range of about 380 nm to about 800 nm and more preferably from about 420 nm to about 680 nm. The reflectance of the reflective resin layer is typically at least (or greater than) 90% and more preferably at least (or greater than) 94%, 95%, 96%, 97%, 98% or 99%. The reflective resin layer may comprise a mixed inorganic-organic polymer or elastomer (and may be a layer consisting of such a polymer or elastomer). In the preferred embodiment, the reflective resin layer comprises silicone and more preferably the reflective resin layer is a silicone layer. The reflective resin layer may comprise a siloxane, such as octamethytrisiloxane. The reflective resin layer may comprise other constituent substances such as at least one further optically reflective material, but a reflective resin material should be the optically dominant and/or majority (by concentration or w/w, for instance) component of the layer. The reflective resin may form at least (or greater than) 50% of the reflective resin layer (by concentration or w/w). Other optically reflective materials that may be present can comprise or include one or more of: titanium dioxide; silicon dioxide; and aluminum hydroxide. The thickness of the reflective resin layer is generally at least (or greater than) about 0.05 mm and typically no more (or less than) about 0.15 mm and more preferably at least about 0.1 mm and/or around 0.1 mm (for example 0.08 mm or 0.09 mm to 0.11 mm or 0.12 mm).

The reflective resin layer is generally distinct (and distinguishable) from the wavelength conversion layer through its composition and/or structure. In particular, the reflective resin layer is normally more reflective (and generally significantly more reflective) than the wavelength conversion layer. The wavelength conversion layer is normally not reflective. Additionally or alternatively, the reflective resin layer typically comprises less wavelength conversion material (such as phosphor) than the wavelength conversion layer and normally the reflective resin layer comprises no wavelength conversion material.

The wavelength conversion layer generally comprises a phosphor, although it may comprise a color filter in other embodiments. The wavelength conversion layer need not cover the entire reflective surface of the substrate. It may be comprise a plurality of wavelength conversion portions, each configured to provide output light of a different wavelength. For example, these may be formed as segments on a disc-shaped substrate. In one embodiment, the wavelength conversion layer comprises phosphor particles (such as a powder) dispersed in a glue, such as silicone. Typically, the silicone of the wavelength conversion layer is generally optically transparent and is not generally reflective. In other words, the reflectance of the wavelength conversion layer is normally significantly lower than the reflective resin layer and typically the reflectance of the wavelength conversion layer is less than 50%, 40%, 30%, 20%, 10% or 5%.

The wavelength conversion device may be formed as a color wheel or phosphor wheel. The disc-shaped (typically annular and more preferably circularly ring-shaped) substrate of this may be adapted to be rotationally driven by a motor (for instance by means of a suitable mounting point for a motor, such as one or more holes). A motor may be further provided, configured to drive rotation of the wavelength conversion device (when suitably coupled to the substrate).

In another aspect, there may be considered a method for manufacturing a wavelength conversion device, comprising: applying a reflective resin layer to a substrate; and providing a wavelength conversion layer on the reflective resin layer, so that the wavelength conversion layer can receive incident light and provide output light by wavelength conversion of the incident light. The output light is reflected by the reflective resin layer. Optional steps to form any aspect of the wavelength conversion device as disclosed herein may also be provided in connection with this method.

In addition, embodiments may be considered in which the step of applying the silicone layer to the substrate comprises one or more of: dispensing; spraying; brushing; flowing; pattern coating; and silk printing silicone. The step of applying the reflective resin layer comprises applying a mix of silicone with an organic solvent, such as such as silicone oil, xylene, methyl siloxane or another material. The method may further comprise curing the reflective resin layer, for instance by one or more of: room temperature vulcanization (RTV); thermal conditioning; and hybrid curing. A further step of cleaning a surface of the substrate before applying the reflective resin layer to this surface may further be considered.

The step of applying the silicone layer to the substrate beneficially comprises setting a thickness of the silicone layer. In particular, this may be performed in order to set a reflectance of the substrate and/or the silicone layer to a desired (maximum) level. Known optimization and experimentation techniques may be applied (such trial and error, interpolation, extrapolation) in order to set the thickness accordingly. An optimal thickness of the reflective resin layer may be around 0.1 mm or between 0.05 mm and 0.15 mm in some embodiments.

FIG. 2 also shows a mode of operation of the phosphor wheel 200. The incident or excitation light 204a (blue) illuminates the phosphor 201. The phosphor 201 generates emission light and this is reflected by the substrate 202 and silicone layer 203 to provide output light 204b (yellow) of a different wavelength from that of the excitation light 204a. The phosphor wheel 200 is rotated by a motor (not shown) in the direction shown by arrow 110. In general terms, a method of operating the wavelength conversion device as disclosed herein may further be provided as another aspect.

Figure 3:
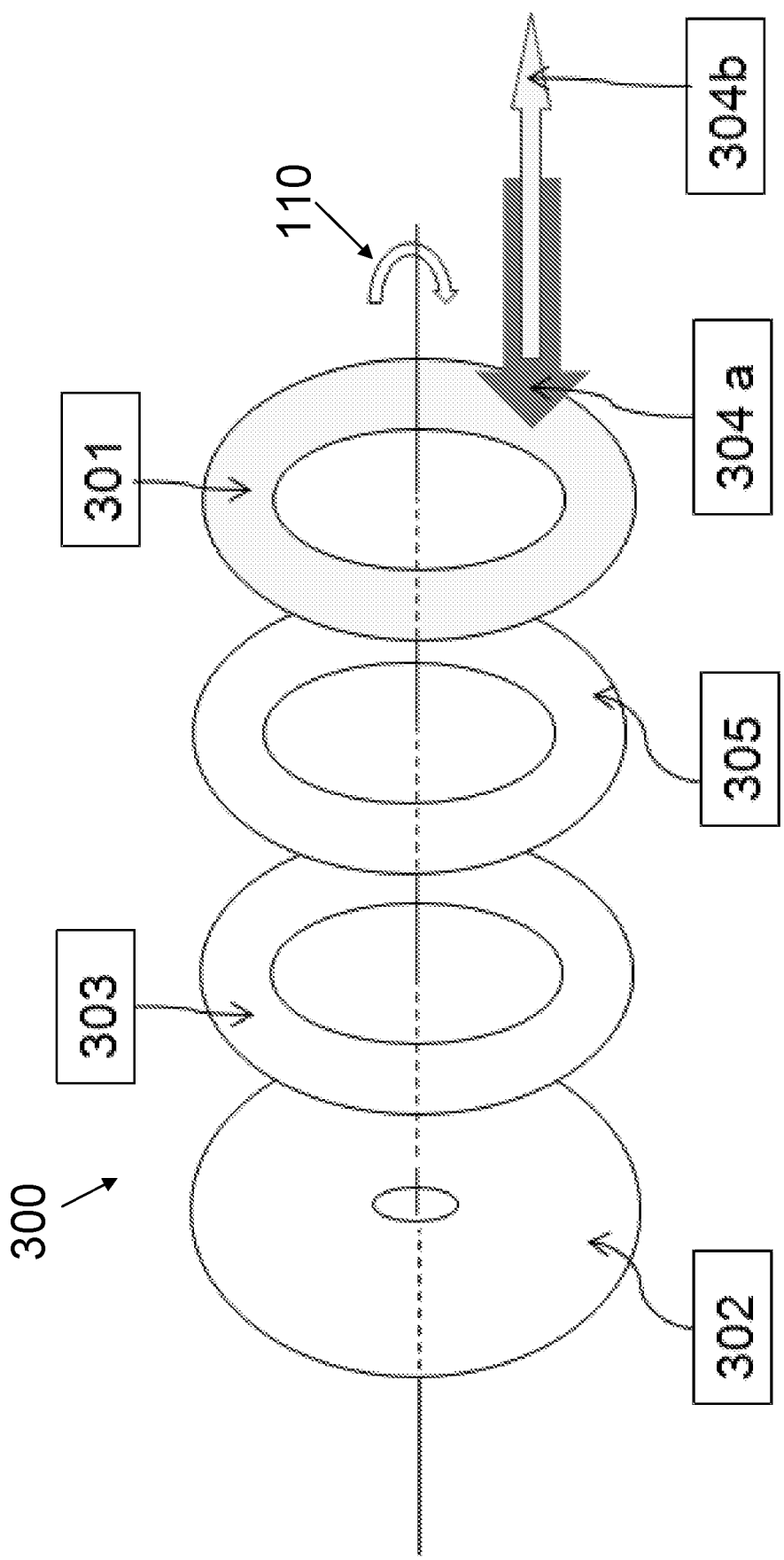
FIG. 3 shows a second embodiment of a phosphor wheel in accordance with the disclosure and in exploded schematic form, further depicting a mode of operation.

The wavelength conversion material need not be of phosphor-in-silicone form. Referring next to FIG. 3, there is illustrated a second embodiment of a phosphor wheel 300 in accordance with the disclosure and in exploded schematic form. Similarly to the embodiment of FIG. 2, a high reflectivity silicone layer 303 is provided on a substrate 302. The configuration of FIG. 3 is similar to that of FIG. 2 in most ways. For example, the composition and structure of the substrate 302 and the composition, structure and method of forming silicone layer 303 are as described above.

However in FIG. 3, the color segment of color ring 301 is formed using a solid-state material, such as phosphor dispersed in glass, phosphor dispersed in crystal or phosphor dispersed in ceramic material. The color segment 301 is bonded to the disk substrate 302 coated with silicone 303 by glue bonding. The glue forms a bonding layer 305.

With reference to the generalized wavelength conversion device discussed above, embodiments in which the wavelength conversion layer comprises a solid-state phosphor may be considered. For example, the wavelength conversion layer may comprise one or more of: phosphor particles dispersed in glass; phosphor particles dispersed in a crystal; and phosphor particles dispersed in a ceramic material.

Additionally or alternatively, the wavelength conversion device may further comprise a bonding layer, arranged to adhere the wavelength conversion layer to the reflective resin layer (and preferably also to the substrate). It is generally then arranged between the wavelength conversion layer and the reflective resin layer. For example, the bonding layer may comprise a glue or tape.

The operation mode of the embodiment of FIG. 3 is similar to that of FIG. 2, as discussed above. For example, it can be used in rotating or static (non-rotating) configurations. The rotation of the phosphor wheel 300 by a motor (not shown) is shown by arrow 110. The incident or excitation light 304a (blue) illuminates the phosphor 301. The phosphor 301 generates emission light and this is reflected by the substrate 302 and silicone layer 303 to provide output light 304b (yellow) of a different wavelength from that of the excitation light 204a.

Figure 4:
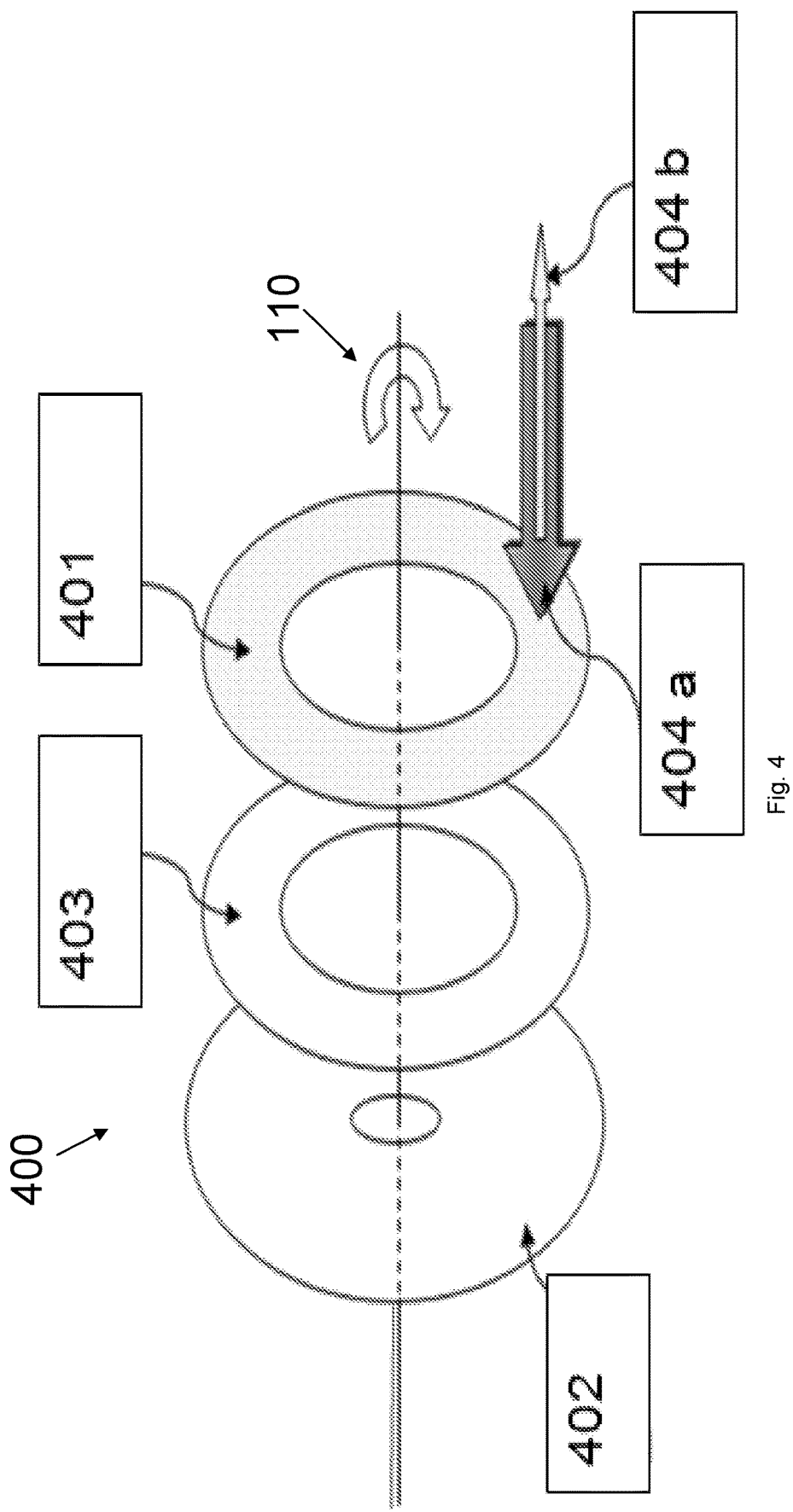
FIG. 4 depicts a third embodiment of a phosphor wheel in accordance with the disclosure and in exploded schematic form, with a mode of operation further shown.

Next, with reference to FIG. 4, there is illustrated a third embodiment of a phosphor wheel 400 in accordance with the disclosure and in exploded schematic form. Similarly to the embodiment of FIG. 2, a high reflectivity silicone layer 403 is provided on a substrate 402. The basic configuration of FIG. 4 is similar to that of FIG. 2 in many respects. For example, the composition and structure of the substrate 402 and the composition and structure of the silicone layer 403 are as described above.

Similarly to the embodiment of FIG. 3, the color segment of color ring 401 comprises a solid-state material, such as phosphor dispersed in glass, phosphor dispersed in crystal or phosphor dispersed in ceramic material. The color segment or color ring 401 is placed directly on the silicone material layer 403. Then, the laminated structure is thermally cured or RTV cured to form the coating layer with high light reflectivity from 380 nm to 800 nm wavelength. Here, the silicone material 403 also plays are role as a bonding material and effectively forms a bonding layer.

With reference to the generalized wavelength conversion device discussed above, the reflective resin layer may be configured to bond the wavelength conversion layer to the substrate. Thus, the reflective resin layer may form at least part (or all) of the bonding layer, as suggested above.

Figure 5:
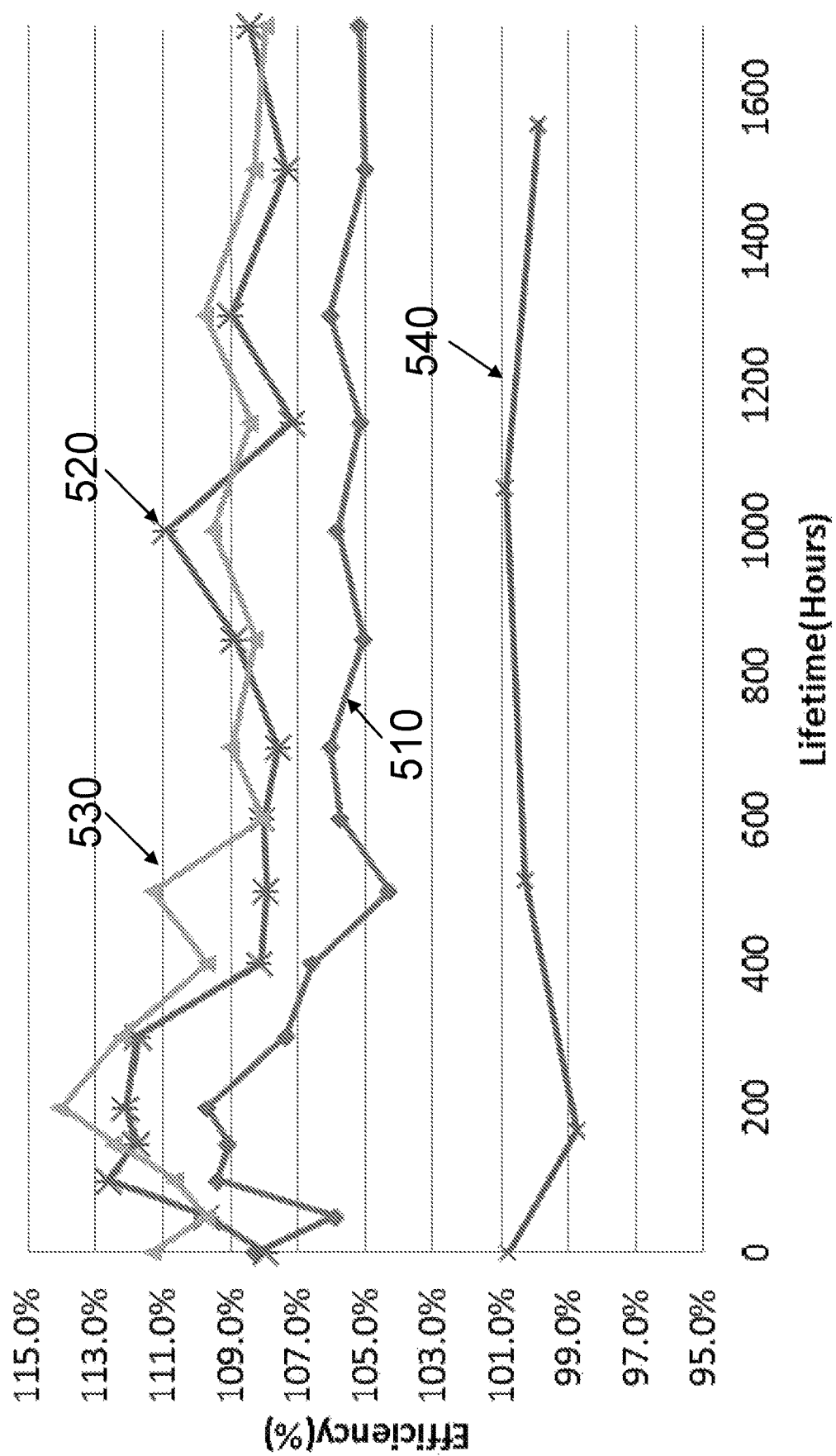
FIG. 5 graphically shows how the efficiencies of phosphor wheels with different thicknesses of reflective resin layer vary over their lifetimes.

The durability of phosphors wheels in accordance with the above-described embodiments of the invention have further been tested. Referring to FIG. 5, there is graphically shown how the efficiencies of phosphor wheels with different thicknesses of reflective resin layer vary over their lifetimes. The (light conversion) efficiencies are measured with reference to an Al-coated disc (without a silicone coating) set to 100% as a benchmark, as discussed above. The lifetimes were measured in hours, up to 1700 hours in total. All of the devices were operated at 200° C. In the experiments, phosphor wheels were manufactured with different average spraying thicknesses of reflective resin coating (in accordance with the embodiment of FIG. 2). These were then installed into a light engine system to test their actual conversion light output.

Four plots are shown in FIG. 5. These represent efficiencies for: a phosphor wheel with a reflective silicone layer of thickness 0.07 mm 510; a phosphor wheel with a reflective silicone layer of thickness 0.1 mm 520; a phosphor wheel with a reflective silicone layer of thickness 0.15 mm 530; and a phosphor wheel with an Al coating (but without a reflective silicone layer) 540, for comparison. It will be seen that the efficiencies of all of the three types of phosphor wheel with reflective silicone layer remain significantly higher than the Al-coated substrate embodiment, throughout a 1000 hour lifetime. Nonetheless, the efficiency when the reflective silicone layer has a thickness of 0.07 mm 510 is not as high as for the other two thicknesses of silicone layer. In these tests, the efficiency when the reflective silicone layer has a thickness of 0.1 mm 520 is generally similar to the efficiency when the reflective silicone layer has a thickness of 0.15 mm 530. However, it was noted in this test that a reflective silicone layer has a thickness of 0.15 mm can result in gradual peeling or cracking of the silicone layer. Moreover, it was noted in the tests reported above that the efficiency for the reflective silicone layer with a thickness of 0.1 mm may generally be slightly higher. Taking both these issues into account, a spraying parameter is considered optimally set to cause the thickness of the silicone layer to be 0.1 mm.

Although embodiments of the invention have been described above, the skilled person may contemplate various modifications or substitutions. For instance, a phosphor wheel (or color wheel) has been disclosed in the embodiments above. However, the wavelength conversion device may be implemented in other rotating or static forms for other forms of lighting, including headlights using solid-state illumination (for instance in the automotive industry) or pico light engines, for instance using static luminous materials.

In all embodiments, the substrate need not comprise a metal or only metal materials. For example, a non-metallic material and/or a composite material may additionally or alternatively be provided. The substrate may be coated with a reflective coating (which may have high reflectivity) or not. The shape of the substrate need not be circular, or even a disc (annular) and other shapes may be provided.

The silicone layer may have different composition and other methods for applying it to the substrate may be considered. For example, other types of white or reflective resin materials may be used. In addition or as an alternative to spray coating, the reflective resin can be applied as a coating by brushing, flowing or pattern coating. Dispensing or screen printing are possible, but not preferred, because the heat required will cause curing of the coating. Other types of wavelength conversion materials, such as filters may be provided. Alternative bonding layers, to adhere the wavelength conversion material to the silicone coated substrate may be used, for instance tape.

The invention claimed is:

1. A wavelength conversion device, comprising:
 a substrate;
 a reflective resin layer on the substrate; and
 a wavelength conversion layer on the reflective resin layer, configured to receive incident light and to provide output light by wavelength conversion of the incident light, such that the output light is reflected by the reflective resin layer.

2. The wavelength conversion device of claim 1, wherein the reflective resin layer comprises a mixed inorganic-organic polymer.

3. The wavelength conversion device of claim 1, wherein the reflective resin layer reflects across a wavelength range of about 420 nm to about 680 nm.

4. The wavelength conversion device of claim 1, wherein the reflective resin layer comprises silicone or a siloxane.

5. The wavelength conversion device of claim 4, wherein the reflective resin layer further comprises at least one further optically reflective material.

6. The wavelength conversion device of claim 5, wherein the at least one further optically reflective material comprises one or more of: titanium dioxide; silicon dioxide; and aluminum hydroxide.

7. The wavelength conversion device of claim 1, wherein the reflective resin layer has a thickness that is at least about 0.05 mm and no more than 0.15 mm.

8. The wavelength conversion device of claim 1, wherein the reflective resin layer is configured to bond the wavelength conversion layer to the substrate.

9. The wavelength conversion device of claim 1, further comprising: a bonding layer, arranged to adhere the wavelength conversion layer to the reflective resin layer.

10. The wavelength conversion device of claim 9, wherein the bonding layer comprises a glue or tape.

11. The wavelength conversion device of claim 1, wherein the wavelength conversion layer comprises a phosphor.

12. The wavelength conversion device of claim 11, wherein the wavelength conversion layer comprises a solid-state phosphor.

13. The wavelength conversion device of claim 12, wherein the wavelength conversion layer comprises one or more of: phosphor particles dispersed in glass; phosphor particles dispersed in a crystal; and phosphor particles dispersed in a ceramic material.

14. The wavelength conversion device of claim 1, wherein the wavelength conversion layer comprises phosphor particles dispersed in thermally cured and solidified silicone.

15. A phosphor wheel comprising the wavelength conversion device of claim 1, wherein the substrate has a disc shape.

16. The phosphor wheel of claim 15, wherein the substrate is adapted to be rotationally driven by a motor.

17. The wavelength conversion device of claim 1, wherein the substrate comprises one of: a metal material; a non-metallic material; and a composite material.

18. A method for manufacturing a wavelength conversion device, comprising:
 applying a reflective resin layer to a substrate; and
 providing a wavelength conversion layer on the reflective resin layer, so that the wavelength conversion layer can receive incident light and provide output light by wavelength conversion of the incident light, the output light being reflected by the reflective resin layer.

19. The method of claim 18, wherein the step of applying the reflective resin layer to the substrate comprises one or more of: dispensing; spraying; brushing; flowing; pattern coating; and silk printing.

20. The method of claim 18, wherein the step of applying the reflective resin layer comprises applying a mix of silicone with an organic solvent.

21. The method of claim 18, further comprising:
curing the reflective resin layer.

22. The method of claim 21, wherein the step of curing the reflective resin layer is performed by one or more of: room temperature vulcanization (RTV); thermal conditioning; and hybrid curing.

23. The method of claim 18, wherein the step of applying the reflective resin layer to the substrate comprises setting a thickness of the reflective resin layer in order to set a reflectance of the reflective resin layer to a desired level.

24. The method of claim 18, wherein the step of providing the wavelength conversion layer on the reflective resin layer includes:
- dispersing a phosphor powder in a liquid transparent silicone; and
- thermally curing and solidifying the liquid transparent silicone.

25. A phosphor wheel comprising:
- a disk substrate; and
- at least one color segment disposed in a concentric pattern on the disk substrate, the at least one color segment including:
  - a reflective resin layer disposed on the disk substrate; and
  - a wavelength conversion layer disposed on the reflective resin layer, the wavelength conversion layer comprising phosphor particles dispersed in thermally cured and solidified silicone.

* * * * *